(12) United States Patent
Jarvis

(10) Patent No.: US 6,295,312 B1
(45) Date of Patent: Sep. 25, 2001

(54) TIME DIVERSITY TRANSMISSION FOR MULTICHANNEL ADAPTIVE EQUALIZATION

(75) Inventor: Susan M. Jarvis, North Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/935,313

(22) Filed: Sep. 22, 1997

(51) Int. Cl.[7] .............................. H04B 1/38; H04B 7/10; H04L 5/16
(52) U.S. Cl. .................. 375/219; 375/218; 375/347; 367/131; 367/134
(58) Field of Search .................... 375/222, 346, 375/347, 348, 219, 218; 367/131, 134, 132; 455/40, 142, 93

(56) References Cited

U.S. PATENT DOCUMENTS

| | | | |
|---|---|---|---|
| 4,418,404 | * | 11/1983 | Gordon et al. ................... 367/132 |
| 5,301,167 | * | 4/1994 | Proakis et al. ................... 367/134 |
| 5,559,757 | * | 9/1996 | Catipovic et al. ................ 367/134 |

* cited by examiner

*Primary Examiner*—William Luther
(74) *Attorney, Agent, or Firm*—Michael J. McGowan; James M. Kasischke; Prithvi C. Lall

(57) ABSTRACT

A method and system are provided for communicating in a time-varying medium. A transmitter sends transmissions of the same message data separated in time with respect to one another. A single sensor receives the transmissions. Each received transmission is buffered until all of the transmissions that were sent are received. The buffered transmissions are simultaneously processed via multichannel adaptive equalization only when all of the transmissions that were sent are received.

17 Claims, 1 Drawing Sheet

TIME DIVERSITY TRANSMISSION FOR MULTICHANNEL ADAPTIVE EQUALIZATION

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to methods of communicating, and more particularly to a method of communicating in a time-varying medium of transmission (e.g., seawater) when only one sensor is available for reception.

(2) Description of the Prior Art

It is established that performance of jointly adaptive, multichannel decision feedback equalizers is superior to that of single-channel decision feedback equalizers. That is, if the signal from a single source is received at multiple sensors, application of a jointly adaptive equalizer to the data from the multiple sensors simultaneously is superior to applying an adaptive equalizer to the data received from a single sensor.

The theory and description of multisensor/multichannel adaptive equalization (as it is known) are described in detail in several prior art references. See, for example, Stojanovic et al., "Coherent Communications Over Long Range Acoustic Telemetry Channels," NATO ASI Series on Acoustic Signal Processing for Ocean Exploration, pp. 607–612, 1993; Stojanovic et al., "Adaptive Multichannel Combining and Equalization of Underwater Acoustic Communications," J. Acoust. Soc. Amer., Vol. 94, No. 3, Pt. 1, pp. 1621–1631, Sept. 1993; Catipovic et al., "Spatial Diversity Processing For Underwater Acoustic Telemetry," IEEE Journal of Oceanic Engineering, Vol. 16, No. 1, pp. 86–97, Jan. 1991; and Jarvis et al., "Implementation of a Multichannel Decision Feedback Equalizer for Shallow Water Acoustic Telemetry Using a Stabilized Fast Transversal Filters Algorithm," Proceedings of Oceans '95, October 1995.

These references assume that the data to be telemetered is bundled into a finite and relatively short duration packet (or packets as is the case for a long data message) and transmitted one time. Also, the assumption is made that multiple spatially separated (or spatially diverse) sensors are available to receive the data. The underlying principle of the existing, prior art method is that a single transmission travels through independent paths in order to reach the spatially separated sensors. Then, in a manner analogous to beamforming, the output of the spatially separated sensors can be combined to recover more of the signal than is possible with a single sensor alone.

Many high-rate telemetry systems use multichannel adaptive equalization to process the telemetered data. As stated above, multichannel adaptive equalization is known to be superior to single channel adaptive equalization. However, for many communications applications such as underwater acoustic telemetry, often only one sensor is available. This is especially true in many Navy applications where the receiving platform has already been designed and deployed. The addition of acoustic telemetry is often a "back fit" to an existing system. Where only one receiving sensor is available, the telemetry receivers/processors incorporated into the existing systems cannot currently take advantage of multichannel adaptive equalization processes.

SUMMARY OF THE INVENTION

Accordingly, it is an object of the present invention to provide a method of communicating that takes advantage of multichannel adaptive equalization when only one receiving sensor is available.

Another object of the present invention is to provide a method of underwater communication that utilizes multichannel adaptive equalization when only one receiving sensor is available.

Still another object of the present invention is to provide a method of communicating in a time-varying medium of transmission.

Other objects and advantages of the present invention will become more obvious hereinafter in the specification and drawings.

In accordance with the present invention, a method and system are provided for communicating in a time-varying medium. A transmitter located in the time-varying medium sends a plurality of transmissions of the same message data but separated in time with respect to one another. A single sensor receives the transmissions at a remote location in the time-varying medium. Each transmission is buffered until all of the transmissions that were sent are received. The transmissions so received are then simultaneously processed via multichannel adaptive equalization only when all of the transmissions that were sent are received.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
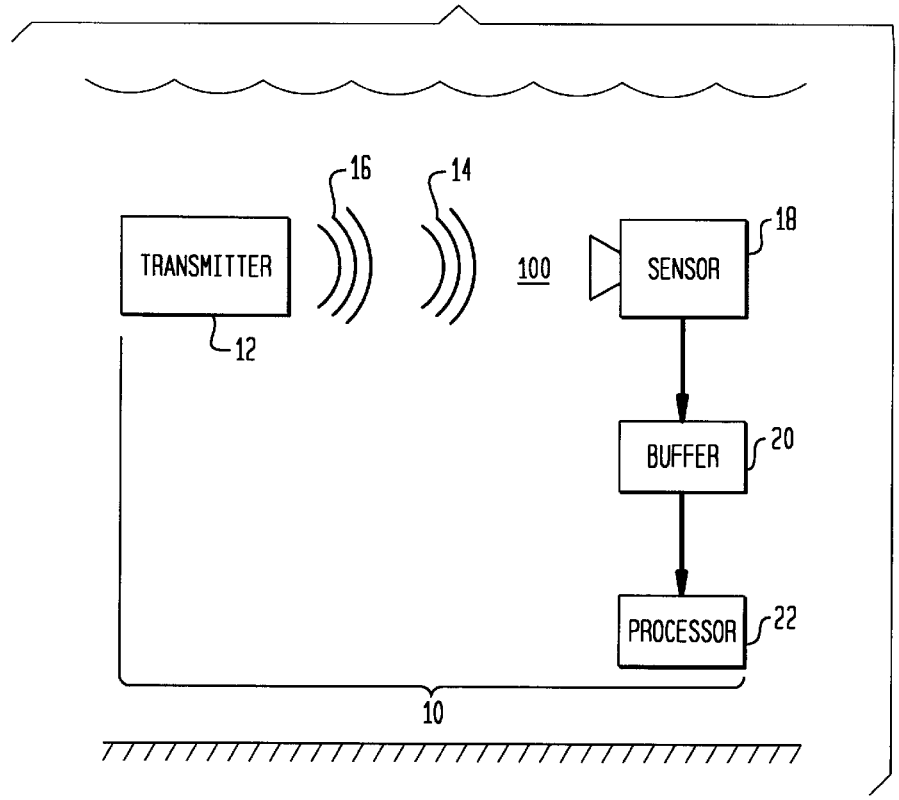
FIG. 1 is a schematic view of an underwater communication system using a single sensor receiver in accordance with the present invention.

Referring now to the drawings, and more particularly to FIG. 1, a system 10 is shown for communicating in a time-varying medium in accordance with the present invention. The term "time-varying medium" is defined herein to mean any environment that changes with respect to time such that transmissions which originate at the same point but that are spaced in time by a finite interval traverse the medium via an independent path. For purposes of description, the time-varying medium is assumed to be seawater which is referenced in FIG. 1 by numeral 100.

System 10 includes a transmitter 12 for generating and transmitting a plurality of transmissions. In the illustrated embodiment, two transmissions are shown, i.e., transmissions 14 and 16, although more than two could be used. In terms of an environment such as seawater 100, transmissions 14 and 16 are acoustic in nature. Remotely located with respect to transmitter 12 is a single sensor 18 such as a hydrophone. Sensor 18 is typically located on a stationary or moving platform (not shown) in seawater 100 and is therefore representative of many Navy receiver systems having only one sensor for receiving underwater transmissions. Coupled to sensor 18 is a storage buffer 20 for storing data, and coupled to buffer 20 is a processor 22 for processing the stored data as will be described further below.

Transmissions 14 and 16 are transmitted in succession and are separated in time by a time delay of length T. The length T of the time delay is chosen to prevent transmissions 14 and 16 from overlapping one another at sensor 18. To insure this, the length T of the time delay is at least as long as the reverberation time of the medium of transmission which, in the illustrated embodiment, is seawater. While the format used for transmissions 14 and 16 will be described further below, it is sufficient at this point in the description to say that transmissions 14 and 16 contain the same data.

Storage buffer 20 stores the information contained in each of transmissions 14 and 16 once they are received by sensor 18. Processor 22 applies one of the known multichannel adaptive equalization process to the data stored in buffer 20. That is, the time-diverse data stored in buffer 20 will be processed in the same fashion as spatially-diverse data is processed in the prior art. However, in accordance with the present invention, the multichannel adaptive equalization process is not performed until and unless all time-separated or time-diverse transmissions (e.g., transmissions 14 and 16 in the example) have been received at sensor 18.

Since seawater 100 is a time-varying medium for acoustic transmissions as defined above, each acoustic transmission 14 and 16 (transmitted at different times) travels through an independent path to arrive at sensor 18. Accordingly, the present invention can make use of a multichannel adaptive equalization process with each input thereof receiving the same information that has travelled an independent path. Thus, once both transmissions 14 and 16 arrive at sensor 18, the effect is the same as spatial diversity where a plurality of spatially separated sensors each receive a single transmission traveling an independent path.

The time diverse transmission method of the present invention takes longer than a single transmission which results in a decrease in the transmission information rate. However, for the current state of the art, the computational burden of the multichannel adaptive equalization process dictates the throughput data rate of an underwater acoustic telemetry system. Thus, it takes the same amount of time to equalize n channels of data whether the data was received in parallel (as in the prior art) or in series (as in the present invention).

Figure 2:
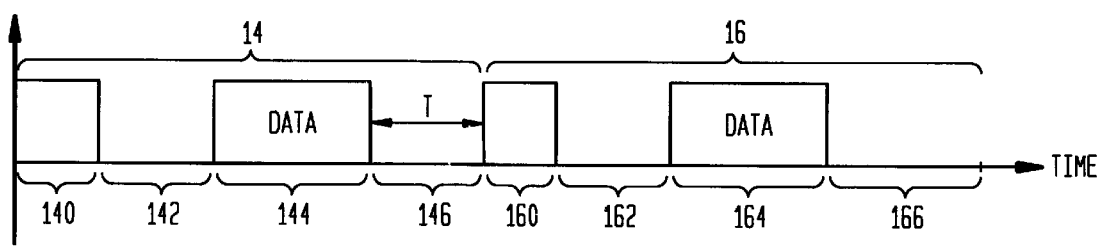
FIG. 2 is a waveform diagram of a time-diverse transmission sequence used in the present invention.

The transmission sequence for transmissions 14 and 16 is depicted as a waveform diagram in FIG. 2. A synchronization portion 140 leads transmission 14 and includes, for example, identification of transmission 14 as the first of two transmissions. Immediately following synchronization portion 140 is a first null portion 142 which can be realized as dead time or a zero level transmission. The length of first null portion 142 is at least as long as the reverberation time of the medium of transmission. Following null portion 142 is a data portion 144 that can be one bit or thousands of bytes in length depending on the application. At the conclusion of data portion 144, another null portion 146 forms the final portion of transmission 14. Null portion 146 can be the time delay of length T discussed above. While not a requirement of the present invention, null portions 142 and 146 can be equal in duration. Transmission 16 then follows in succession with synchronization portion 160 including identification of transmission 16 as the second of two transmissions. Synchronization portion 160 might also contain information identifying transmission 16 as the final transmission if that is the case. The remaining portions of transmission 16 (i.e., null portion 162, data portion 164 and null portion 166) are identical to the analogous portions of transmission 14. Note that if a data message is longer than what can be handled by the allotted size of the "data portion" of the transmission, the data message can be divided into several message portions. Each message portion would become data portion 144 and then be repeated as data portion 164 before the next message portion is transmitted in the same fashion. That is, each message portion is transmitted in two or more time-separated (time-diverse) transmissions (e.g., transmissions 14 and 16 in the above example) which are then processed in the same fashion as spatially-diverse data is processed in the prior art. This process is repeated for each message portion in the data message until the entire data message has been transmitted.

The advantages of the present invention are numerous. Systems having only one receiving sensor can now make use of the preferred multichannel adaptive equalization processes. Thus, the known performance gains of spatial diversity can now be achieved in single sensor/receiver systems. This is significant because the difference between the minimum diversity case of two paths or channels and the single channel case is often the difference between equalizing the data with an intelligible error rate and not equalizing the data at all.

Time diversity for multichannel adaptive equalization process has ben described specifically herein for the underwater acoustic environment which is highly reverberant and highly time-varying. This is because it is particularly of interest where acoustic telemetry capability is being "back fit" into existing systems where only one receiving sensor is available. However, there may be other highly reverberant highly time-varying communications environments, e.g., enclosed environments utilizing RF communications, space communications, etc., to which the present method could apply. Thus, it will thus be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for communicating comprising the steps of:

transmitting, from a first location in a time-varying medium, a plurality of transmissions separated in time with respect to one another;

receiving said plurality of transmissions at a sensor in a second location in said time-varying medium;

buffering each of said plurality of transmissions so received until all of said plurality of transmissions are received; and simultaneously processing said plurality of transmissions so received only when all of said plurality of transmissions are received.

2. A method according to claim 1 wherein said step of transmitting comprises the steps of:

forming each of said plurality of transmissions to a have, in succession, a leading synchronization portion, a first null portion, a data portion and a second null portion, wherein said data portion is identical for each of said plurality of transmissions; and delaying transmission of each of said plurality of transmissions for a period of time equal to or greater than a reverberation time of said time-varying medium.

3. A method according to claim 2 wherein the length of time of said first null portion is equal to the length of time of said second null portion.

4. A method according to claim 2 wherein said period of time is said second null portion.

5. A method according to claim 1 wherein said plurality of transmissions is two in number.

6. A method according to claim 1 wherein said step of simultaneously processing includes the use of a multichannel adaptive equalization process.

7. A method according to claim 1 wherein said time-varying medium is seawater and each of said plurality of transmissions is acoustic in nature.

8. A method for communicating comprising the steps of:

providing a single sensor in a time-varying medium;

transmitting in succession two transmissions into said time-varying medium wherein a time delay separates said two transmissions, wherein each of said two transmissions has, in succession, a leading synchronization portion, a null portion and a data portion, wherein said data portion is identical for each of said two transmissions;

detecting said two transmissions with said single sensor;

buffering said two transmissions so received until both of said two transmissions are received; and simultaneously processing said two transmissions so received using a multichannel adaptive equalization process only when both of said two transmissions are received.

9. A method according to claim 8 wherein the length of time of each of said null portion and said time delay is equal to or greater than a reverberation time of said time-varying medium.

10. A method according to claim 9 wherein the length of time of said null portion is equal to said time delay.

11. A method according to claim 8 wherein said time-varying medium is seawater and said two transmissions are acoustic in nature.

12. A system for communicating comprising:

a transmitter for transmitting, in a time-varying medium, a plurality of transmissions separated in time with respect to one another;

a single sensor positioned at a second location in said time-varying medium that is located remotely with respect to said first location, said single sensor receiving said plurality of transmissions;

a buffer coupled to said single sensor for storing each of said plurality of transmissions so received until all of said plurality of transmissions are received; and a processor coupled to said buffer for simultaneously processing said plurality of transmissions so received only when all of said plurality of transmissions are received.

13. A system as in claim 12 wherein said transmitter forms each of said plurality of transmissions to have, in succession, a leading synchronization portion, a first null portion, a data portion and a second null portion, wherein said data portion is identical for each of said plurality of transmissions, and wherein the length of time of said first null portion and the length of time of said second null portion are each equal to or greater than the reverberation time of said time-varying medium.

14. A system as in claim 13 wherein the length of time of said first null portion is equal to the length of time of said second null portion.

15. A system as in claim 12 wherein said plurality of transmissions transmitted by said transmitter is two in number.

16. A system as in claim 12 wherein said processor uses a multichannel adaptive equalization process.

17. A system as in claim 12 wherein said time-varying medium is seawater and said single sensor is a hydrophone.

* * * * *